(12) United States Patent
Wu et al.

(10) Patent No.: US 12,340,448 B2
(45) Date of Patent: Jun. 24, 2025

(54) COMMENT VIDEO GENERATION METHOD AND APPARATUS

(71) Applicant: SHANGHAI HODE INFORMATION TECHNOLOGY CO., LTD., Shanghai (CN)

(72) Inventors: Jialing Wu, Shanghai (CN); Yiou Li, Shanghai (CN); Chang Xie, Shanghai (CN); Xiao Yang, Shanghai (CN); Qingshan Niu, Shanghai (CN); Zhen Huang, Shanghai (CN); Lixin Hou, Shanghai (CN); Lei Cao, Shanghai (CN); Ligen Wang, Shanghai (CN); Chen Cai, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 232 days.

(21) Appl. No.: 18/197,601

(22) Filed: May 15, 2023

(65) Prior Publication Data
US 2023/0368448 A1    Nov. 16, 2023

(30) Foreign Application Priority Data
May 16, 2022    (CN) .......................... 202210529245.8

(51) Int. Cl.
*G06T 11/60* (2006.01)
*G11B 27/02* (2006.01)

(52) U.S. Cl.
CPC .............. *G06T 11/60* (2013.01); *G11B 27/02* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2014/0013200 A1* | 1/2014 | White | H04N 21/235 715/230 |
| 2014/0215512 A1* | 7/2014 | Maruyama | H04N 21/2743 725/34 |
| 2020/0042584 A1* | 2/2020 | Vennix | G06F 40/103 |
| 2022/0174369 A1* | 6/2022 | Lu | H04N 21/8133 |
| 2023/0195276 A1* | 6/2023 | Xiong | G06F 3/04817 715/810 |
| 2023/0283855 A1* | 9/2023 | Chen | H04N 21/4788 386/244 |
| 2024/0346728 A1* | 10/2024 | Nagano | H04L 67/10 |

* cited by examiner

*Primary Examiner* — Edward Martello
(74) *Attorney, Agent, or Firm* — BakerHostetler

(57) ABSTRACT

This application provides techniques of generating comment videos. The techniques comprise receiving a selection of a target text video template, wherein the target text video template is associated with synthesis material, and wherein the synthesis material comprises a video track; determining at least one target comment corresponding to the target text video template; segmenting the at least one target comment and obtaining at least one comment segment comprised in each of the at least one target comment; and generating a corresponding comment video by adding the at least one comment segment of each target comment to the synthesis material.

20 Claims, 11 Drawing Sheets

---

102 — Receive a selection instruction for a target text video template, where the target text video template includes a synthesis material comprising a video track 104 — Determine at least one target comment corresponding to the target text video template 106 — Obtain at least one comment segment included in each target comment, where the comment segment is obtained by segmenting the target comment 108 — Generate a corresponding comment video by adding the at least one comment segment included in each target comment to the synthesis material

COMMENT VIDEO GENERATION METHOD AND APPARATUS

CROSS-REFERENCE TO RELATED APPLICATION

The present application claims priority to Chinese Patent Application No. 202210529245.8, filed on May 16, 2022, which is incorporated herein by reference in its entirety.

BACKGROUND

With the rapid development of computer technologies, network technologies, and multimedia technologies, videos are involved in many aspects of people's work and life. Videos carry richer and more expressive information than text and pictures, and therefore are increasingly popular among users. Various videos emerge, and there is an increasingly obvious tendency towards making a video.

SUMMARY

In view of this, embodiments of this application provide a comment video generation method. This application also relates to a comment video generation apparatus, a computing device, and a computer-readable storage medium, to resolve a technical problem, in the conventional technology, that there is a high requirement for a user and low video generation efficiency.

According to a first aspect of the embodiments of this application, a comment video generation method is provided, and includes:

- receiving a selection instruction for a target text video template, where the target text video template includes a synthesis material of a comment video;
- determining at least one target comment corresponding to the target text video template;
- obtaining at least one comment segment included in each target comment, where the comment segment is obtained by segmenting the target comment; and
- adding the at least one comment segment included in each target comment to the synthesis material, to generate a corresponding comment video.

According to a second aspect of the embodiments of this application, a comment video generation apparatus is provided, and includes:

- a receiving module, configured to receive a selection instruction for a target text video template, where the target text video template includes a synthesis material of a comment video;
- a first determining module, configured to determine at least one target comment corresponding to the target text video template;
- an obtaining module, configured to obtain at least one comment segment included in each target comment, where the comment segment is obtained by segmenting the target comment; and
- a generation module, configured to add the at least one comment segment included in each target comment to the synthesis material, to generate a corresponding comment video.

According to a third aspect of the embodiments of this application, a computing device is provided, and includes:

a memory and a processor.

The memory is configured to store computer executable instructions, and the processor is configured to execute the computer executable instructions to implement the steps of the comment video generation method.

According to a fourth aspect of the embodiments of this application, a computer-readable storage medium is provided. The computer-readable storage medium stores computer executable instructions. When the computer executable instructions are executed by a processor, the steps of the comment video generation method are implemented.

According to the comment video generation method provided in this application, a plurality of configured text video templates may be provided in advance for a user to select, and the user may directly select the target text video template, where the synthesis material of the comment video is configured in the target text video template; may determine the target comment required for video synthesis based on the selected target text video template; obtain the at least one comment segment included in each target comment; and automatically add the at least one comment segment included in each target comment to the synthesis material configured in the target text video template, to generate the corresponding comment video. In this way, the user can quickly import, based on the target text video template, a comment that the user likes, automatically segment the comment into a plurality of segments, and add the plurality of segments to corresponding locations in the synthesis material, to generate the corresponding comment video. Therefore, a viewing effect of the comment video is improved. In addition, the user needs to perform only a simple selection operation, there is relatively weak dependence on the user, and a video generation process is simple. Therefore, a requirement for a capability of the user is lowered, and comment video generation efficiency is improved.

DESCRIPTION OF EMBODIMENTS

Figure 1:
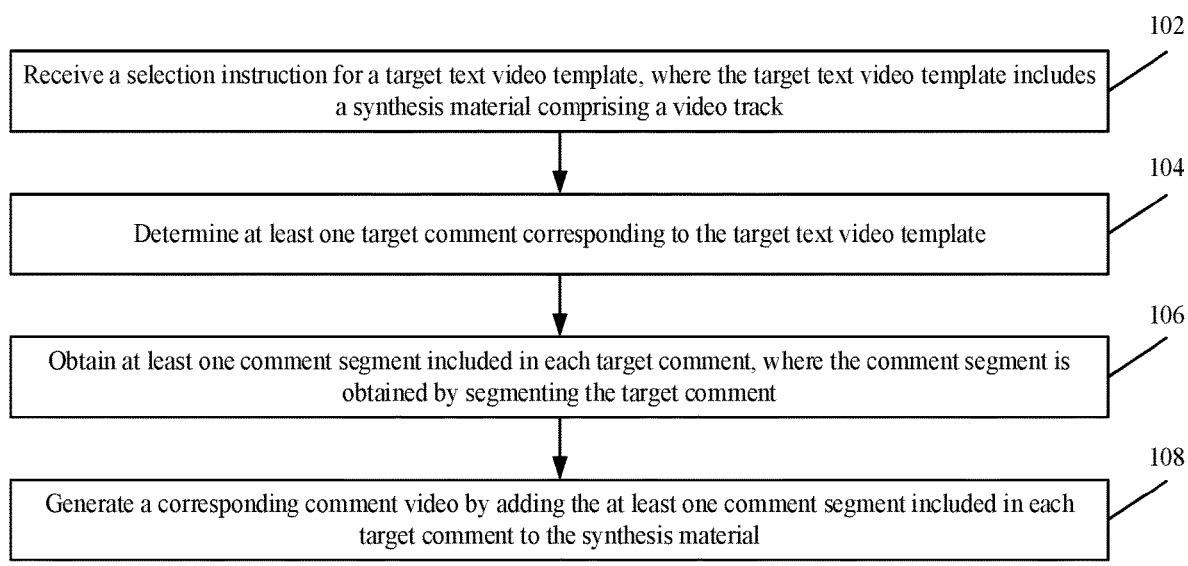
FIG. 1 is a flowchart of a comment video generation method according to an embodiment of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" may be used in one or more embodiments of this application to describe various types of information, the information is not limited to these terms. These terms are merely used to distinguish between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

Terms related to one or more embodiments of this application are first explained.

A text video template is a template in which graphics and text layout and recommended materials (a background video, dub, music, and the like) are embedded.

A graphics and text editor is an editor that performs a secondary adjustment operation on a synthesized video. After selecting a video template, a user may choose to import a single comment/a plurality of comments, and then a comment video may be automatically synthesized. In the graphics and text editor, secondary editing of the synthesized comment video may be supported.

It should be noted that currently, to generate a comment video, the user needs to manually combine a plurality of comments, import text in batches by using editing software, reconstruct all pieces of comment text one by one, manually type corresponding original comment author information for each comment, manually drag a subtitle track of the original comment author information to enable the subtitle track to correspond to subtitle track duration of the posted comment, configure a corresponding material picture for each comment, and manually drag a material track and the subtitle track to enable the material track and the subtitle track to correspond to each other. Consequently, there is a relatively high threshold for making a comment video, and many users who are willing to collect good sentences and good comments cannot conveniently produce works.

Therefore, the embodiments of this application provide a solution of generating a collection video based on a plurality of comments, which is simple in interaction and easy in operation. Specifically, a comment in an application program can be obtained and stored in a database based on a preset rule, a comment is recommended based on a selected text video template, a user can search by using a keyword to select a comment for video synthesis, and a corresponding comment video is automatically synthesized based on the selected comment and user information of the comment. In addition, the comment selected by the user may be segmented to process one comment into a plurality of segments, and posting user information of the comment may be associated. When the video is synthesized on a video generation platform, the posting user information associated with the comment may be correspondingly displayed in a time when the comment is displayed in a picture, and each comment corresponds to a recommended material (video/picture) in a text video template. In addition, a secondary adjustment operation may be performed on the synthesized video (secondary sentence segmentation and secondary editing and modification of comment text are supported).

It should be noted that the comment video generation method provided in the embodiments of this application may be applied to a video generation platform. The video generation platform may provide a user with capabilities such as comment import, editing, and comment video generation. The video generation platform may be an application program or a web page.

Increasingly, more people like to collect various types of comment information, and synthesize a comment collection video based on their favorite comment information for viewing and sharing. In a specific video synthesis process, a user needs to manually import and edit various types of comment information, set a material and layout, associate the various types of information, and the like. In a process of generating a comment collection video, there is strong dependence on various import and editing operations of the user. The video generation process is complex, and requires a relatively high editing capability of the user. Consequently, there is relatively low comment collection video generation efficiency.

This application provides a comment video generation method. This application also relates to a comment video generation apparatus, a computing device, and a computer-readable storage medium. The comment video generation method, the comment video generation apparatus, the computing device, and the computer-readable storage medium are described in detail in the following embodiments one by one.

FIG. 1 is a flowchart of a comment video generation method according to an embodiment of this application. The method specifically includes the following steps.

Step 102: Receive a selection instruction for a target text video template, where the target text video template includes a synthesis material of a comment video.

It should be noted that a video generation platform may prestore a plurality of text video templates, and graphics and text layout, recommended materials (a background video, dub, music, and the like), a plurality of synthesis parameters, and the like are embedded in each text video template. Based on the text video template, a comment may be automatically recommended to a user, a comment selected by the user may be automatically processed, and a processed comment may be inserted into a corresponding location in the embedded material, to efficiently generate a comment video. Specifically, the text video template may provide a synthesis material to the user, the user may independently enter a subtitle, and then the synthesis material (audio or video) is enabled to match the entered subtitle. That is, the synthesis material may be adjusted based on the subtitle entered by the user, so that the synthesis material matches the entered subtitle, that is, an audio and video track is adjusted to match a subtitle track to synthesize a required comment video.

Each text video template may be pre-created by a worker through the video generation platform, or may be created by a worker through another function intermediate platform (namely, a service that provides a corresponding function) and then imported to the video generation platform for storage.

In actual application, the video generation platform may display a template selection interface to the user. The template selection interface may include at least one to-be-selected text video template, and the user may select the target text video template required by the user from each to-be-selected text video template. The target text video template is a template selected by the user and used to generate the corresponding comment video. The synthesis material for generating a comment video is embedded in the target text video template. A type and a quantity of synthesis materials are not limited. For example, the synthesis material may be a video or a picture, there may be a plurality of synthesis materials, and each synthesis material corresponds to one comment.

In addition, a preview area may be disposed in the template selection interface. After the user selects the target text video template, the synthesis material, namely, a video in which no comment content is inserted, included in the target text video template may be played in the preview area, and when a confirmation instruction is received, a currently selected text video template is used as the target text video template selected by the user. In this way, content in the target text video template selected by the user may be displayed to the user in the preview area for the user to view, to determine whether to select or switch to another text video template.

In specific implementation, when no text video template is currently selected, no content may be displayed in the preview area, or all the text video templates may be sequentially played, so that the user understands specific template content, and quickly selects a text video template.

Figure 2A:
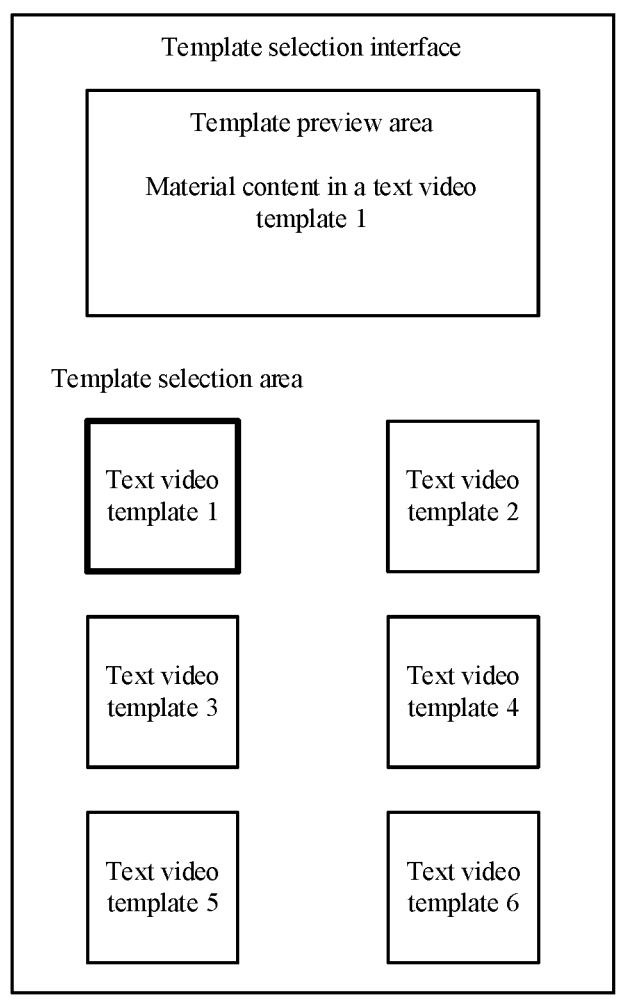
FIG. 2a is a schematic diagram of a template selection interface according to an embodiment of this application.

For example, FIG. 2a is a schematic diagram of a template selection interface according to an embodiment of this application. As shown in FIG. 2a, the template selection interface includes a template preview area and a template selection area, and the template selection area includes six to-be-selected text video templates: a text video template 1, a text video template 2, a text video template 3, a text video template 4, a text video template 5, and a text video template 6. If the user currently selects the text video template 1, material content in the text video template 1 is played in the template preview area.

In this embodiment of this application, the user taps the target text video template in all the to-be-selected text video templates provided by the video generation platform. In this case, the video generation platform may receive the selection instruction for the target text video template. The selection instruction carries a template identifier, and the synthesis material of the comment video included in the target text video template may be obtained based on the template identifier. Subsequently, the corresponding comment video may be automatically generated based on the target text video template directly. The user needs to perform only a simple template selection operation, there is relatively weak dependence on the user, and a video generation process is simple. Therefore, a requirement for a capability of the user is lowered, and comment video generation efficiency is improved.

Step 104: Determine at least one target comment corresponding to the target text video template.

It should be noted that different text video templates require different types of comments. Therefore, after the target text video template is determined, the at least one target comment corresponding to the target text video template may be determined, so that content of the target comment is inserted into the synthesis material included in the target text video template, to generate the corresponding comment video.

In an optional implementation of this embodiment, the target text video template further includes a recommended comment obtaining rule and a recommended comment sorting rule, and in this case, a specific implementation process of determining the at least one target comment corresponding to the target text video template may be:

obtaining at least one corresponding recommended comment from a comment database based on the recommended comment obtaining rule when a comment import instruction is received;

displaying the at least one recommended comment based on the recommended comment sorting rule; and using, as the target comment, a recommended comment indicated by a received selection operation, where the selection operation is an operation of selecting a comment from the at least one recommended comment.

Specifically, the recommended comment obtaining rule is a comment obtaining rule pre-configured for the target text video template. A recommended comment that can be inserted into the target text video template can be selected from a large quantity of to-be-selected comments of different sources and different attributes based on the recommended comment obtaining rule. In other words, a comment may be automatically recommended to the user based on the target text video template, and the user may select the target comment required for synthesizing the comment video from the recommended comment. For example, the recommended comment obtaining rule may be a comment selection rule. Comments corresponding to a video manuscript A, a video manuscript B, a video manuscript C, a video manuscript D, a video manuscript E, and a video manuscript F are to be selected from all comments in an application program 1. In this case, the video generation platform may select the comments corresponding to the video manuscript A, the video manuscript B, the video manuscript C, the video manuscript D, the video manuscript E, and the video manuscript F in the application program 1 from all comments stored in the comment database, and the selected comments are recommended comments.

In actual application, the video generation platform may support import of comments in a plurality of application programs. Therefore, a large quantity of comments may be extracted from the plurality of application programs in advance, the extracted comments may be stored in a database, and the video generation platform may subsequently directly select the corresponding recommended comment from the comments stored in the database. In specific implementation, the database may be deployed on the video generation platform, that is, the comments in the plurality of application programs are imported to the video generation platform in advance, and then are locally queried and selected. Alternatively, the database may be deployed on another service that provides a data storage function, and an invoking interface may be provided to the video generation platform. When the video generation platform needs to import a comment, the corresponding recommended comment is automatically obtained from the database through the invoking interface, and presented to the user for the user to select.

In addition, in the recommended comment obtaining rule, in addition to selecting the recommended comment from different sources (namely, different application programs and different video manuscripts), the recommended comment may be selected with reference to attribute information of the comment. The attribute information may be a comment type, a quantity of effective words, an emotion parameter, a recall parameter, and the like. Comment information is further filtered based on the attribute information, to obtain a recommended comment finally recommended to the user. For example, a comment corresponding to a video manuscript is first selected based on a comment source, where the video manuscript may be selected based on a manuscript partition and a manuscript label dimension, and then filtering may be performed based on the attribute information of the comment. A final recommended comment is selected based only on information indicating that a quantity of effective words in the comment is greater than a specific length (it is temporarily assumed that the length is greater than or equal to 6), a natural language processing (NLP) negative emotion model score is less than a specific threshold (a lower score indicates a lower negative emotion, and it is temporarily assumed that the score is less than 0.7), the comment is not recalled by another negative control policy, and the like, and is displayed to the user.

The recommended comment sorting rule may include a first rule for sorting and displaying obtained recommended comments to the user. The recommended comment sorting rule may be that each recommended comment is first classified based on a specified classification level, and then recommended comments of each type are sorted based on a specified parameter (for example, a quantity of likes or a posting time). In this case, only when the user selects a type of comments, sorted recommended comments of this type are displayed. The specified classification level may include first-level classification and second-level classification. For example, the first-level classification is "recommended" and "mine", and the second-level classification is "keyword A", "keyword B", "subject", and "source file".

Figure 2B:
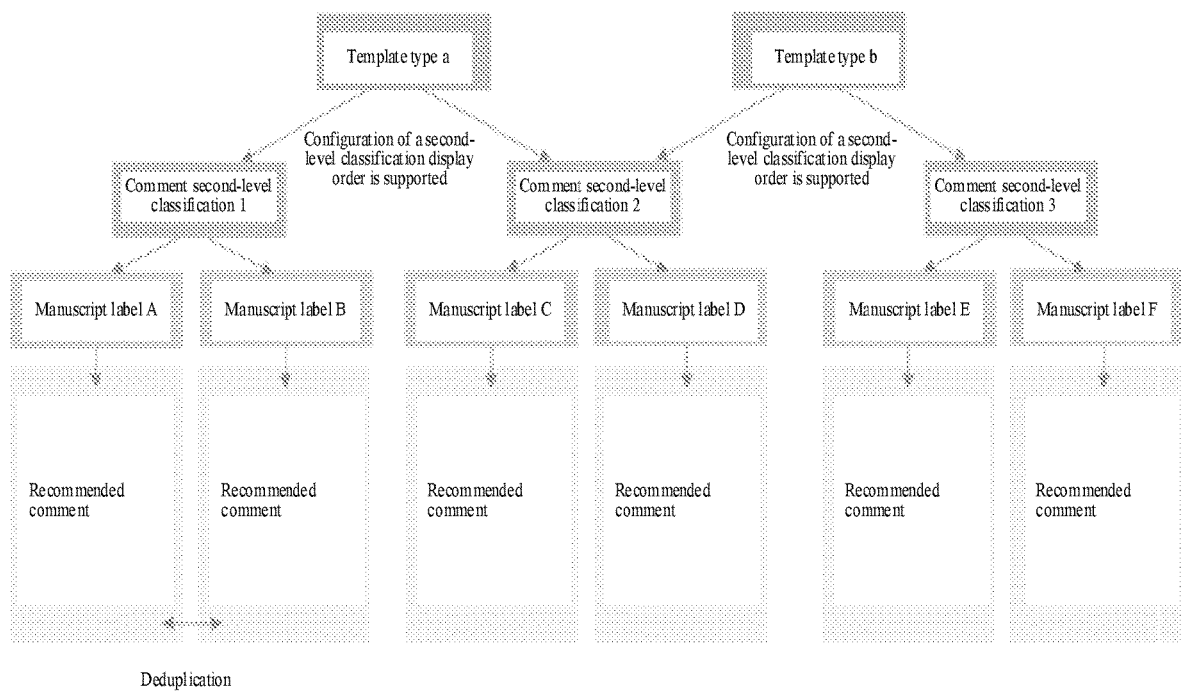
FIG. 2b is a schematic diagram of sorting recommended comments according to an embodiment of this application.

For example, FIG. 2b is a schematic diagram of sorting recommended comments according to an embodiment of this application. As shown in FIG. 2b, a template type a includes comment second-level classification 1 and comment second-level classification 2 (configuration of a second-level classification display order is supported), the comment second-level classification 1 includes a manuscript label A and a manuscript label B, and the comment second-level classification 2 includes a manuscript label C and a manuscript label D; and a template type b includes the comment second-level classification 2 and comment second-level classification 3 (configuration of a second-level classification display order is supported), and the comment second-level classification 3 includes a manuscript label E and a manuscript label F. Selected recommended comments that are sorted based on a quantity of likes and a posting time dimension are displayed under each manuscript label. A single comment corresponds to only one manuscript label, and deduplication processing may be performed based on a weight.

Alternatively, the recommended comment sorting rule may include sorting based on a search word. That is, the video generation platform may provide a search box on a recommended comment display page, the user may enter a search word in the search box, and in this case, the video generation platform may traverse and search each recommended comment based on the search word. Specifically, the search word entered by the user may be received, and a corresponding matching comment may be determined from the at least one recommended comment based on the search word and displayed.

In actual application, the recommended comment display page may first display all recommended comments obtained through sorting based on the first rule, and the user may directly select a required comment from all the recommended comments as the target comment. If the search word entered by the user in the search box is received, matching may be further performed based on the search word, to display a corresponding matching comment, so as to reduce a quantity of candidate comments, and in this case, the user may select the target comment from all displayed matching comments.

There may be at least one target comment. Each time the user selects a target comment, a quantity of selected target comments may be increased by 1, and the quantity of selected target comments is displayed at a bottom of the recommended comment display page, so that the user knows, in a timely manner, a quantity of comments selected by the user. In this case, for a text video template that has a requirement for a quantity of inserted comments, a quantity of comments that can be selected, a remaining quantity of comments that can be selected, or the like may be displayed on the recommended comment display page, to notify the user of the quantity of comments that can be selected, so as to improve user experience.

In specific implementation, filtering logic may be periodically run and executed by using a query task of an offline data warehouse tool (Hive table), and the determined recommended comment corresponding to the target video template may be written into a search server, so that the user quickly searches a large quantity of recommended comments for a comment required by the user.

In actual application, a comment import instruction may be triggered by the user, and the video generation platform may provide a plurality of import modes. After selecting the target template in the template selection interface, the user may trigger display of an import mode selection interface. After selecting a specific import mode in the import mode selection interface, the user may trigger the comment import instruction. The comment import instruction carries an import mode identifier. The video generation platform obtains the target comment in a corresponding import mode based on the import mode identifier. For example, when the import mode is import of a comment from another platform, after the corresponding comment import instruction is received, the step of obtaining a recommended comment from the comment database and sorting and displaying the recommended comment for the user to select may be performed.

Figure 2C:
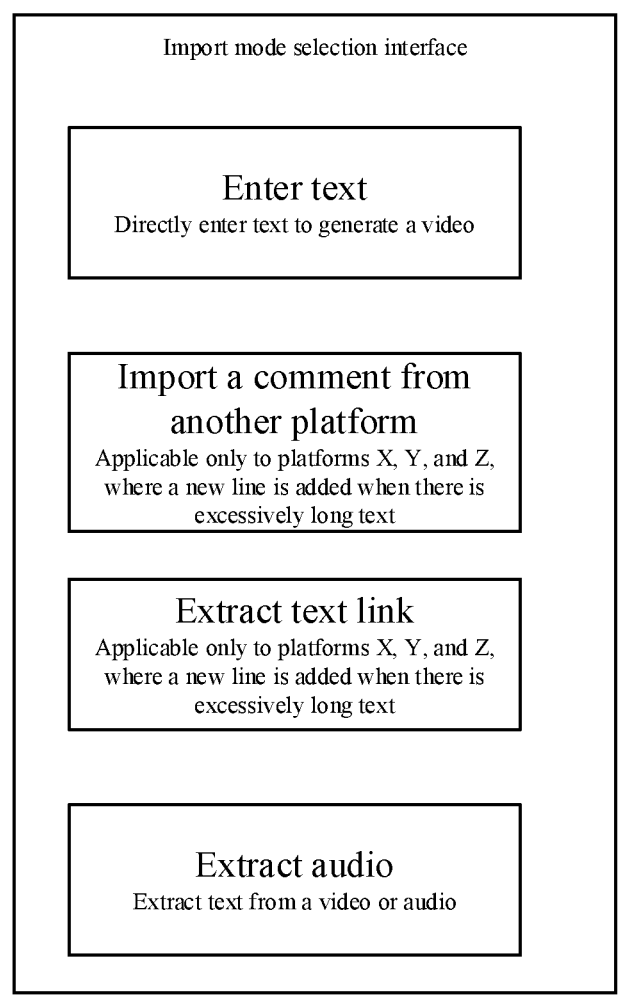
FIG. 2c is a schematic diagram of an import mode selection interface according to an embodiment of this application.
Figure 2D:
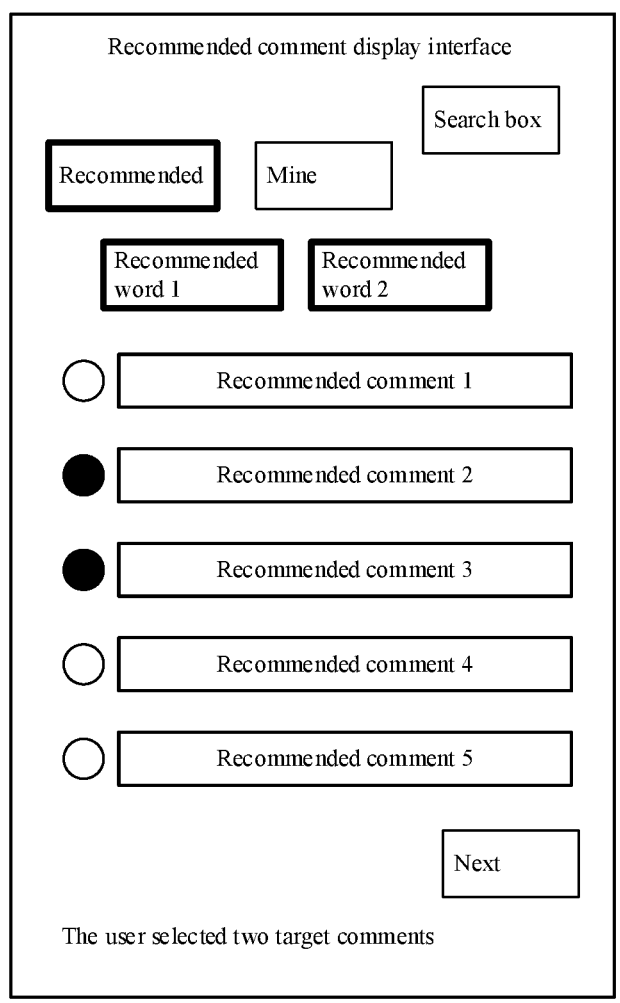
FIG. 2d is a schematic diagram of a recommended comment display interface according to an embodiment of this application.

In an example, it is assumed that the target text video template selected by the user in the template selection interface shown in FIG. 2a is the text video template 1. In this case, the import mode selection interface shown in FIG. 2c may be displayed. FIG. 2c is a schematic diagram of an import mode selection interface according to an embodiment of this application. The import mode selection interface includes four import modes: text input (text is directly entered to generate a video), import of a comment from another platform (which is applicable only to platforms X, Y, and Z, where a new line is added when there is excessively long text), text link extraction (which is applicable only to platforms X, Y, and Z, where a new line is added when there is excessively long text), and audio extraction (text is extracted from a video or audio). It is assumed that the user selects import of a comment from another platform in the import mode selection interface. In this case, the recommended comment may be obtained from the database, and sorted and displayed to the user. FIG. 2d is a schematic diagram of a recommended comment display interface according to an embodiment of this application. In "recommended word 1" in a second-level menu (recommended word 1 and recommended word 2) in "recommended" in a first-level menu (recommended and mine), there are five recommended comments (recommended comments 1 to 5), the user selects two recommended comments (recommended comments 2 and 3), and "the user selects two target comments" is displayed at the very bottom. In addition, all the recommended comments possibly cannot be completely displayed in one page, and a next control is tapped for page turning.

Figure 2E:
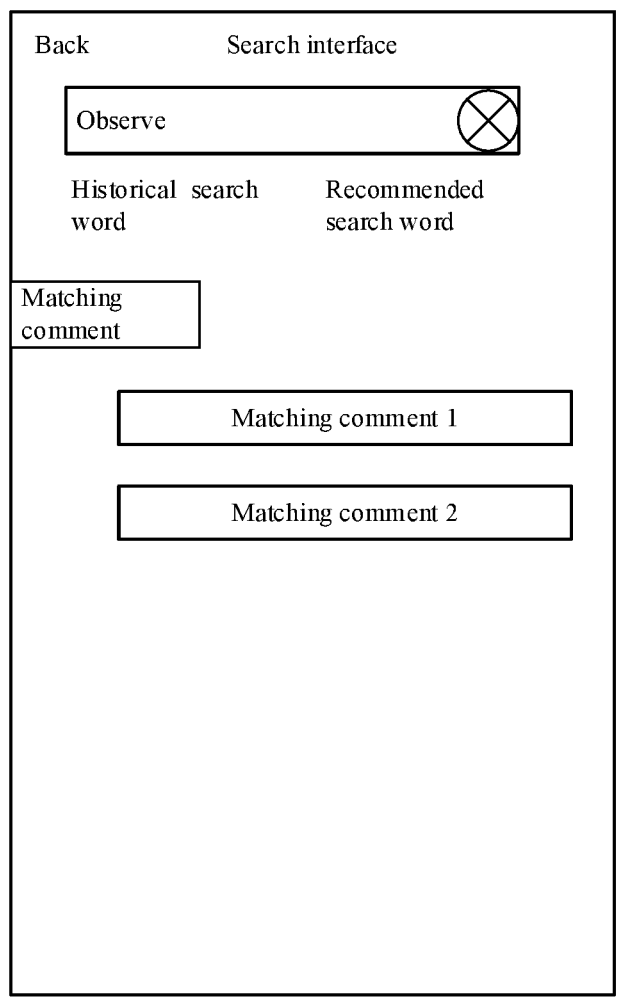
FIG. 2e is a schematic diagram of a search interface according to an embodiment of this application.

In addition, as shown in FIG. 2*d*, a search box is provided in the recommended comment display interface, and a search interface shown in FIG. 2*e* may be displayed by tapping the search box. FIG. 2*e* is a schematic diagram of a search interface according to an embodiment of this application. When a cursor in the search box in the search interface is tapped, a keyboard is activated and enabled (in this case, when an area other than the keyboard is tapped, the keyboard is disabled). A historical search word and a recommended search word may be displayed under the search box. When there is a character in the search box, "x" (namely, a delete control) is displayed, and when "x" is tapped, entered text may be deleted. When the user enters "observe", a corresponding matching comment may be displayed, for example, a matching comment 1 and a matching comment 2 shown in FIG. 2*e*. When "back" is tapped, the recommended comment display interface shown in FIG. 2*d* may be returned. If no matching comment can be found, prompt information "no matching result available" may be displayed.

It should be noted that all selected and sorted recommended comments may be displayed in the recommended comment display interface, all matching comments obtained through searching may be presented in the search interface, and posting user information and comment content information may be displayed when the recommended comment and the search comment are displayed (information is displayed in a specified quantity of lines at most, and if there is more information, "more" is displayed at the end to support enabling of full-screen floating layer display).

In addition, a plurality of displayed recommended comments and search comments may be selected, a comment may be selected (selection of a plurality of comments is supported) when a check box before the comment is tapped, the comment is unselected when the check box is tapped for the second time, "x comments selected" that appears at the bottom in real time is floating layer logic, and all selected comments may be viewed when the floating layer is pulled up.

Step 106: Obtain at least one comment segment included in each target comment, where the comment segment is obtained by segmenting the target comment.

It should be noted that the comment is usually relatively long, and there is a relatively poor viewing effect and user experience when complete comment content is directly displayed in the corresponding synthesis material. Therefore, in this embodiment of this application, the obtained target video may be segmented to obtain the at least one comment segment included in the target comment, and each comment segment is subsequently inserted into a corresponding location in the synthesis material, to generate the corresponding comment video, so as to improve a video viewing effect.

The comment segment is segment content obtained by segmenting the target comment. The comment segment may include one sentence or a plurality of sentences, that is, the comment segment may be of a single sentence type or a multi-sentence combination type. In a process of segmenting the target comment, the type of the comment segment is determined based on the target video template selected by the user.

In actual application, the step of segmenting the target video to obtain the corresponding at least one comment segment may be implemented by the video generation platform by invoking a corresponding segmentation algorithm. The segmentation algorithm may include a sentence segmentation algorithm and a sentence segmentation and paragraph segmentation algorithm. A specific algorithm that is to be invoked is determined based on the type of the comment segment. The segmentation algorithm may be deployed on the video generation platform or another service intermediate platform.

Figure 3:
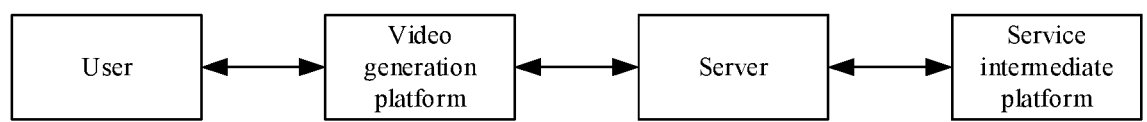
FIG. 3 is an interactive schematic diagram of a comment segmentation process according to an embodiment of this application.

For example, the segmentation algorithm is deployed on another service intermediate platform. FIG. 3 is an interactive schematic diagram of a comment segmentation process according to an embodiment of this application. As shown in FIG. 3, the user interacts with the video generation platform (which may be deployed in a client), selects the target comment and the target text video template, and requests segmentation from a server, the server invokes the segmentation algorithm deployed on the another service intermediate platform, and segments the target comment based on the target text video template, the segmentation algorithm assembles and returns each comment segment obtained through segmentation to the server, and the server returns each comment segment to the video generation platform.

In an optional implementation of this embodiment, the target text video template further includes a comment segmentation rule, and in this case, a specific implementation process of obtaining the at least one comment segment included in each target comment may be:

determining a segmentation manner of a second target comment based on the comment segmentation rule, where the second target comment is any one of the at least one target comment;

and segmenting the second target comment in the segmentation manner, to obtain at least one second comment segment included in the second target comment.

In actual application, the comment segmentation rule may indicate that a segmentation algorithm that is to be invoked is determined based on the type of the comment segment required by the target video. For example, the comment segmentation rule is to obtain a single sentence segment through segmentation, or to obtain a multi-sentence combination segment through segmentation. In addition, the comment segmentation rule may further specify a quantity of comment segments to be obtained through segmentation.

The video generation platform may determine the segmentation manner of the second target comment based on the comment segmentation rule configured in the target video template, and then segment the second target comment in the segmentation manner, to obtain the at least one second comment segment included in the second target comment. By analogy, each target comment may be used as the second target comment and segmented to obtain a corresponding second comment segment. In this way, different comment segmentation rules may be defined for different video templates, to customize information such as the type of the comment segment and a quantity of sentences. In this way, a plurality of requirements of different users may be met, and there is relatively high applicability.

In an optional implementation of this embodiment, a specific implementation process of segmenting the second target comment in the segmentation manner, to obtain the at least one second comment segment included in the second target comment may be:

when the segmentation manner is single sentence segmentation, segmenting the second target comment into at least one comment sentence, and using the at least one comment sentence as the at least one second comment segment included in the second target comment; or when the segmentation manner is combinatorial segmentation, segmenting the second target comment into at least one comment sentence, and combining the at least one comment sentence to obtain the at least one second comment segment included in the second target comment.

In actual application, when the segmentation manner is single sentence segmentation, it indicates that the type of the comment segment required by the target text video template is the single sentence type, that is, one comment segment includes only one sentence. Therefore, in this case, the second target comment may be segmented into at least one comment sentence, and the at least one comment sentence is directly used as the at least one second comment segment included in the second target comment.

In addition, when the segmentation manner is combinatorial segmentation, it indicates that the type of the comment segment required by the target text video template is the multi-sentence combination type, that is, one comment segment may include a plurality of sentences. Therefore, the second target comment may be first segmented into at least one comment sentence, and then the at least one comment sentence obtained through segmentation may be combined to obtain the at least one second comment segment included in the second target comment.

It should be noted that the segmentation manner may include two steps: intelligent sentence segmentation and intelligent paragraph segmentation. Intelligent paragraph segmentation is performed based on an execution result of intelligent sentence segmentation, and reconstruction is performed based on sentence segmentation. Only intelligent sentence segmentation may be performed for some video templates, and intelligent sentence segmentation and intelligent paragraph segmentation need to be performed for some models, to obtain a corresponding comment segment through segmentation.

In this embodiment of this application, language logic of a single sentence is simple and accuracy of single sentence segmentation is higher. Therefore, when the type of the comment segment required by the target text video template is the multi-sentence combination type, the target comment is not directly segmented into segments (including a plurality of sentences), but is first segmented into single sentences, and then the sentences are combined to obtain the corresponding comment segment, to ensure accuracy of the comment segment obtained through segmentation.

In an optional implementation of this embodiment, a specific implementation process of segmenting the second target comment into the at least one comment sentence may include the following steps:

initially segmenting the second target comment based on a specified segmentation rule, to obtain an initial comment sentence;

determining a to-be-segmented sentence whose sentence length exceeds a maximum length limit in each initial comment sentence, where the maximum length limit is a parameter included in the comment segmentation rule;

re-segmenting the to-be-segmented sentence based on the sentence length of the to-be-segmented sentence, the maximum length limit, and a specified phrase dictionary, to obtain a comment sentence that meets the maximum length limit, where the specified phrase dictionary is a set of at least one specified phrase; and using the comment sentence that meets the maximum length limit as the at least one comment sentence included in the second target comment.

The specified segmentation rule may refer to a policy for initially segmenting the target comment. For example, the specified segmentation rule may include coarse segmentation and fine segmentation.

In actual application, in coarse segmentation, segmentation may be performed based on a natural separator. The natural separator includes but is not limited to a line break, a period, and another symbol that explicitly express an end of a sentence. After the coarse segmentation step is performed, some comment sentences meet the maximum length limit in the comment segmentation rule, and some other comment sentences do not meet the maximum length limit. Secondary fine segmentation may be performed on the some comment sentences that do not meet the maximum length limit by using a sequence tagging model.

The sequence tagging model is a customized sentence-breaking model. A principle of the sequence tagging model is that punctuation is removed by mining open-source subtitle information, articles, and other data, to obtain a punctuation-free sample through combination, and the model is used to predict a location at which text is broken in the sample. The model is based on BERT. A structure of the model is optimized, a feature dimension and a sequence length are compressed, and model distillation is performed, to reduce a model inference time.

It should be noted that after the second target comment is initially segmented based on the specified segmentation rule, to obtain the initial comment sentence, some initial comment sentences meet the maximum length limit in the comment segmentation rule, and there may still be some initial comment sentences that do not meet the maximum length limit. The to-be-segmented sentence that does not meet the maximum length limit may be further segmented with reference to the specified phrase dictionary, to obtain the comment sentence that meets the maximum length limit, and the comment sentence that meets the maximum length limit is used as the at least one comment sentence included in the second target comment.

The specified phrase dictionary is phrases, namely, phrases that cannot be segmented, obtained by mining new words based on a hot column of an application program, a bullet-screen comment, a creation scenario, and text content entered by the user. In comparison with a common word segmentation model, some animation, comic, game, novel (ACGN), and hot joke-related entities can be identified, to avoid a case in which a sentence segmentation algorithm effect is affected because these entities are broken in the middle.

Specifically, when the to-be-segmented sentence is re-segmented based on the sentence length of the to-be-segmented sentence, the maximum length limit, and the specified phrase dictionary, if the sentence length of the current to-be-segmented sentence is greater than a specified quantity of times (for example, 2) of the maximum length limit, an appropriate segmentation point is found near the maximum length limit (less than the maximum length limit), where the segmentation point is located at a phrase boundary, and the phrase boundary is a phrase included in the specified phrase dictionary, and the current to-be-segmented sentence is cyclically segmented until a remaining length is less than or equal to the specified quantity of times of the maximum length limit.

In addition, if the sentence length of the current to-be-segmented sentence is less than or equal to a specified quantity of times (for example, 2) of the maximum length limit, an appropriate segmentation point is found at a half (less than the maximum length limit) of the length of the current to-be-segmented sentence, where the segmentation point is located at a phrase boundary, and the phrase boundary is a phrase included in the specified phrase dictionary, and the current to-be-segmented sentence is cyclically segmented until a remaining length is less than or equal to the maximum length limit.

In this embodiment of this application, when the second target comment is segmented into the at least one comment sentence, there is initial segmentation and a bottom line policy, to ensure that the comment sentence obtained through segmentation meets the maximum length limit in the comment segmentation rule, and ensure that the comment sentence can be subsequently successfully inserted into the synthesis material in the target video template, so as to ensure a success rate of generating the comment video.

In an optional implementation of this embodiment, after the comment sentence that meets the maximum length limit is obtained, the method may further include:

determining a to-be-combined sentence whose sentence length is less than a minimum length limit in the comment sentence that meets the maximum length limit, where the minimum length limit is a parameter included in the comment segmentation rule; and combining the to-be-combined sentence based on a specified combination rule, to obtain a comment sentence that meets the minimum length limit.

Correspondingly, the using the comment sentence that meets the maximum length limit as the at least one comment sentence included in the second target comment includes:

using a comment sentence that meets the maximum length limit and the minimum length limit as the at least one comment sentence included in the second target comment.

It should be noted that the comment segmentation rule may include the minimum length limit in addition to the maximum length limit. Therefore, after the comment sentence that meets the maximum length limit is obtained, the to-be-combined sentence whose sentence length is less than the minimum length limit in the comment sentence that meets the maximum length limit may be further determined, and then the to-be-combined sentence may be combined based on the specified combination rule, to obtain the comment sentence that meets the minimum length limit. The specified combination rule may be a rule for combining short sentences preconfigured in the target text video template. For example, the specified combination rule includes but is not limited to the following: If there is an explicit terminator (for example, a period or a line break) at an end of a sentence, the sentence should not be reconstructed with a next sentence; when a sentence starts with a symbol such as a dash or a closing quotation mark, the sentence tends to be reconstructed with a previous sentence; or if a length existing after sentence combination is greater than the maximum length limit, no recombination is performed.

In this embodiment of this application, the comment sentence that meets the maximum length limit may not meet the minimum length limit. Therefore, the to-be-combined sentence whose sentence length is less than the minimum length limit in the comment sentence that meets the maximum length limit may be determined, and an attempt may be made to reconstruct a to-be-combined sentence that does not meet the minimum length limit with a previous comment sentence or a next comment sentence until the minimum length limit is met, and in this case, the comment sentence that meets the maximum length limit and the minimum length limit may be used as the at least one comment sentence included in the second target comment. In this way, the comment sentence obtained through splitting meets both the maximum length limit and the minimum length limit in the comment segmentation rule, to ensure that the comment sentence can be subsequently successfully inserted into the synthesis material in the target video template, so as to ensure a success rate of generating the comment video.

In an optional implementation of this embodiment, a specific implementation process of combining the at least one comment sentence to obtain the at least one second comment segment included in the second target comment may be:

determining whether every two adjacent sentences in the at least one comment sentence belong to a same segment; and combining comment sentences that belong to a same segment into one second comment segment.

It should be noted that the segmentation manner may include two steps: intelligent sentence segmentation and intelligent paragraph segmentation. Intelligent paragraph segmentation is performed based on an execution result of intelligent sentence segmentation, and reconstruction is performed based on sentence segmentation. Only intelligent sentence segmentation may be performed for some video templates, and intelligent sentence segmentation and intelligent paragraph segmentation need to be performed for some models, to obtain a corresponding comment segment through segmentation. When intelligent paragraph segmentation needs to be performed, that is, when the segmentation manner is combinatorial segmentation, the at least one comment sentence obtained through segmentation may be combined to obtain the at least one second comment segment included in the second target comment, and the second comment segment obtained in this case includes a plurality of sentences.

In actual application, whether every two adjacent sentences in the at least one comment sentence belong to the same segment may be determined based on a pre-trained combination model, and then the comment sentences that belong to the same segment are combined into one second comment segment. The combination model is trained by using a paragraph in an article.

In an example, the pre-trained combination model may be a BERT model, and performs prediction in a next sentence prediction (NSP) manner. Word embedding coding is performed on every two adjacent sentences, and whether the every two adjacent sentences belong to the same segment is predicted by using a CLS token.

It should be noted that through model prediction, the at least one second comment segment may be combined into several comment segments, that is, the second target comment segment is segmented into several comment segments. A quantity of comment sentences included in some comment segments meets a limit in the target text video template, and a quantity of comment sentences included in some comment segment groups does not meet the limit in the target text video template. The comment segment that includes sentences whose quantity does not meet the limit in the target text video template may be post-processed based on a specified policy.

In an example, post-processing performed based on the specified policy may be as follows: An attempt is made to fuse a comment segment that includes sentences who quantity is less than a minimum sentence quantity limit with a previous or next adjacent comment segment; and an attempt is made to segment a comment segment that includes sentences whose quantity is greater than a maximum sentence quantity limit for the second time by using a rule, until a condition is met. After the foregoing algorithm step is performed, the second target comment is segmented into several comment segments, and a quantity of sentences included in each comment segment meets the limit.

Figure 4:
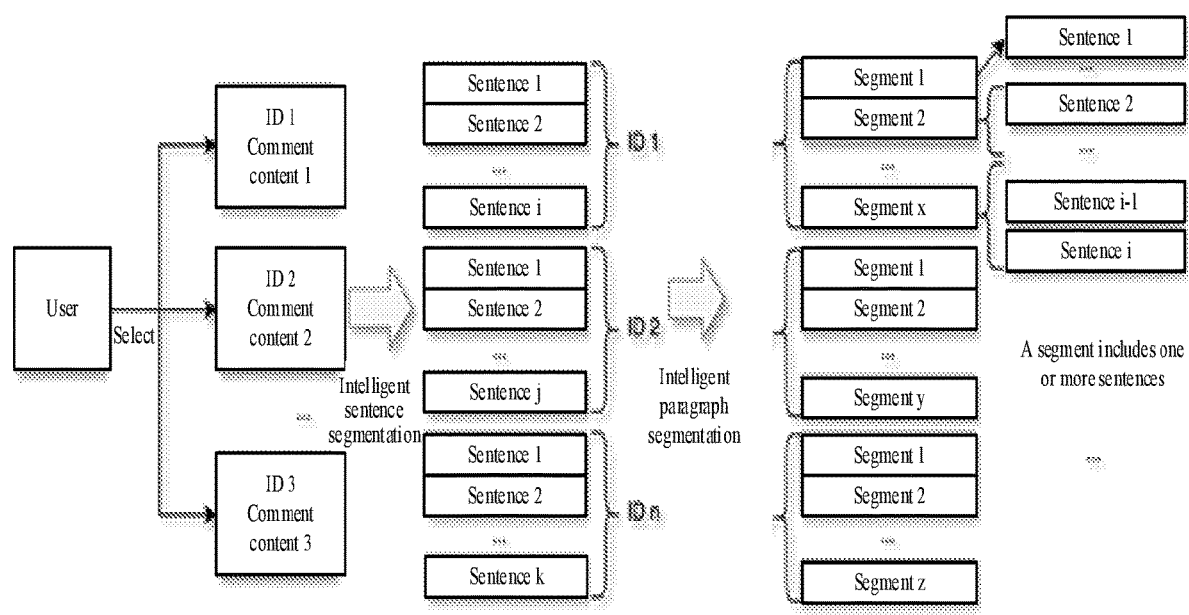
FIG. 4 is a schematic diagram of a segmentation process of a target comment according to an embodiment of this application.

For example, FIG. 4 is a schematic diagram of a segmentation process of a target comment according to an embodiment of this application. As shown in FIG. 4, the user selects a target comment, each target comment carries an ID of a posting user, comment content 1 carries an ID 1, comment content 2 carries an ID 2, and comment content n carries an ID n. Intelligent sentence segmentation is first performed. The comment content corresponding to the ID 1 is segmented to obtain sentences 1-$i$, the comment content corresponding to the ID 2 is segmented to obtain sentences 1-$j$, and the comment content corresponding to the ID 3 is segmented to obtain sentences 1-$k$. Intelligent paragraph segmentation is then performed. The sentences corresponding to the ID 1 are combined to obtain corresponding segments 1-$x$; the sentences corresponding to the ID 2 are combined to obtain corresponding segments 1-$y$; and the sentences corresponding to the ID 3 are combined to obtain corresponding segments 1-$z$. Each segment includes one or more sentences. As shown in FIG. 4, the sentences 1-$i$ are allocated to the segments 1-$x$, and so on.

It should be noted that the target comment selected by the user may be segmented to obtain at least one comment segment. During segmentation, there is dependence on the maximum length limit and the minimum length limit of a sentence, and the parameter is provided in the target text video template. In addition, the segmentation algorithm may first clean the target comment. This includes but is not limited to removing interference information in the target comment in a manner such as regular expression matching or a rule. The interference information includes but is not limited to an expression, a URL link, an HTML tag, and meaningless punctuation.

In this embodiment of this application, different comment segmentation rules may be defined for different video templates, to customize information such as the type of the comment segment and a quantity of sentences. In this way, a plurality of requirements of different users may be met, and there is relatively high applicability.

In an optional implementation of this embodiment, the target text video template further includes an initially specified timbre, and in this case, after the at least one comment segment included in each target comment is obtained, the method may further include:

determining an audio segment corresponding to each comment segment based on the initially specified timbre.

It should be noted that the initially specified timbre may be further configured in the target comment template, for example, a male timbre or a female timbre. Then, each comment segment is dubbed based on the initially specified timbre, to obtain the corresponding audio segment, and subsequently the audio segment and the corresponding comment segment may be synchronously displayed to enhance fun in generating a comment video.

Step 108: Add the at least one comment segment included in each target comment to the synthesis material, to generate a corresponding comment video.

It should be noted that after each target comment is segmented to obtain the at least one comment segment included in each target comment, the at least one comment segment included in each target comment may be added to the synthesis material, in other words, inserted into the target text video template, to generate the corresponding comment video.

In an optional implementation of this embodiment, the target text video template further includes a comment display parameter, and in this case, a specific implementation process of adding the at least one comment segment included in each target comment to the synthesis material, to generate the corresponding comment video may be:

determining a target synthesis material corresponding to a first target comment, where the first target comment is any one of the at least one target comment;

determining a display time of at least one first comment segment included in the first target comment in the target synthesis material based on the comment display parameter;

inserting the at least one first comment segment into the target synthesis material based on the display time, to obtain a comment sub-video corresponding to the first target comment; and combining comment sub-videos corresponding to all the target comments, to generate the comment video.

Specifically, the comment display parameter may be a related parameter used to display the comment segment in the corresponding synthesis material, and is pre-configured by the target video template, that is, the target video template pre-configures a display policy of each target comment.

It should be noted that different target comments may correspond to different synthesis materials. Therefore, the target synthesis material corresponding to the first target comment may be determined, each comment segment included in the first target comment may be inserted into the corresponding target synthesis material, to obtain the comment sub-video corresponding to the first target comment, and then the comment sub-videos corresponding to all the target comments may be combined to obtain the corresponding comment video.

When each comment segment included in the first target comment is inserted into the corresponding target synthesis material, how to specifically insert the comment segment into the target synthesis material needs to be determined, that is, a time at which the comment segment is inserted into the target synthesis material needs to be determined. The comment display parameter is pre-configured in the target text video template, and therefore the display time of the at least one first comment segment included in the first target comment in the target synthesis material may be determined based on the comment display parameter, and each first comment segment is inserted into a corresponding location in the target synthesis material based on the display time.

In this embodiment of this application, an association relationship between each comment segment and a target material, namely, a display time corresponding to each comment segment in the target synthesis material, may be automatically determined based on the target video template, and the comment segment is inserted into the target synthesis material based on the display time, so that a track of the comment segment and a track of a background material may automatically correspond to each other, and the user does not need to manually perform a drag operation. The user needs to perform only a simple selection operation, there is relatively weak dependence on the user, and a video generation process is simple. Therefore, a requirement for a capability of the user is lowered, and comment video generation efficiency is improved.

In an optional implementation of this embodiment, the first target comment carries posting user information, and in this case, after the display time of the at least one first comment segment included in the first target comment in the target synthesis material is determined based on the comment display parameter, the method further includes:
using the display time as a display time of the posting user information.

Correspondingly, the inserting the at least one first comment segment into the target synthesis material based on the display time, to obtain a comment sub-video corresponding to the first target comment includes:
inserting the at least one first comment segment and the posting user information into the target synthesis material based on the display time, to obtain the comment sub-video corresponding to the first target comment.

It should be noted that when obtaining the target comment, the video generation platform may synchronously obtain the posting user information corresponding to the target comment, and when generating the comment video corresponding to the selected target comment based on the target video template, may synchronously display the posting user information of the first target comment when displaying each first comment segment included in the first target comment in the target synthesis material.

In actual application, the posting user information of the first target comment is synchronously displayed within an initial display time of each comment segment included in the first target comment. That is, a display start time of a first comment segment included in the first target comment is a display start time of the posting user information of the first target comment, and a display end time of a last comment segment included in the first target comment is a display end time of the posting user information of the first target comment.

In this embodiment of this application, the display time of the at least one first comment segment included in the first target comment in the target synthesis material may be used as the display time of the posting user information of the first target comment, and the at least one first comment segment and the posting user information are inserted into the target synthesis material based on the display time, to obtain the comment sub-video corresponding to the first target comment. In this way, the video generation platform may automatically correspond a track of the comment segment to a track of the posting user information based on the determined display time, and the user does not need to manually perform a drag operation. The user needs to perform only a simple selection operation, there is relatively weak dependence on the user, and a video generation process is simple. Therefore, a requirement for a capability of the user is lowered, and comment video generation efficiency is improved.

In an optional implementation of this embodiment, the comment display parameter includes an initial display moment and display duration of the first comment segment, and a specific implementation process of determining the display time of the at least one first comment segment included in the first target comment in the target synthesis material based on the comment display parameter may be:
using the initial display moment as a target display moment;
using the target display moment as an insertion moment of an $i^{th}$ first comment segment, where i is a positive integer;
determining a deletion moment of the $i^{th}$ first comment segment based on the insertion moment and the display duration; and
updating the target display moment to the deletion moment, increasing i by 1, and performing the step of using the target display moment as an insertion moment of an $i^{th}$ first comment segment, until i is equal to a quantity of the at least one first comment segment, to obtain an insertion moment and a deletion moment of each first comment segment.

It should be noted that the initial display moment is a display moment of the first comment segment in the first target comment in the corresponding target synthesis material, and the display duration of the first comment segment may be duration in which the first comment segment is continuously displayed. In addition, the insertion moment is a moment at which display is started, and the deletion moment is a moment at which display is canceled.

In actual application, the insertion moment of the first comment segment in the first target comment is the specified initial display moment, and the deletion moment of the first comment segment may be determined by increasing the initial display moment by the display duration. The deletion moment of the first comment segment is an insertion moment of a next segment, in other words, a display end moment of the current first comment segment is a display start moment of the next first comment segment, and by analogy, the insertion moment and deletion moment of each first comment segment in the first target comment may be obtained, and subsequently each first comment segment may be inserted into a corresponding location in the target synthesis material based on the insertion moment and the deletion moment of each first comment segment, to obtain the comment sub-video corresponding to the first target comment.

For example, the initial display moment is the tenth second, the display duration of the first comment segment is 15 seconds, and the first target comment includes five first comment segments: a comment segment 1, a comment segment 2, a comment segment 3, a comment segment 4, and a comment segment 5. An insertion moment of the comment segment 1 in the corresponding target synthesis material is the tenth second, and a deletion moment is the $25^{th}$ second; an insertion moment of the comment segment 2 in the corresponding target synthesis material is the $25^{th}$ second, and a deletion moment is the $40^{th}$ second; an insertion moment of the comment segment 3 in the corresponding target synthesis material is the $40^{th}$ second, and a deletion moment is the $55^{th}$ second; an insertion moment of the comment segment 4 in the corresponding target synthesis material is the $55^{th}$ second, and a deletion moment is the $70^{th}$ second; and an insertion moment of the comment segment 5 in the corresponding target synthesis material is the $70^{th}$ second, and a deletion moment is the $85^{th}$ second.

In this embodiment of this application, the insertion moment and the deletion moment of each first comment segment in the corresponding target synthesis material may be automatically obtained based on the initial display moment and the display duration of the first comment segment configured in the target text video template, so that each first comment segment included in the first target comment may be automatically displayed at the corresponding time. In this way, the track of the comment segment and the track of the background material may automatically correspond to each other, and the user does not need to manually perform a drag operation. The user needs to perform only a simple selection operation, there is relatively weak dependence on the user, and a video generation process is simple. Therefore, a requirement for a capability of the user is lowered, and comment video generation efficiency is improved.

In an optional implementation of this embodiment, the inserting the at least one first comment segment into the target synthesis material based on the display time, to obtain a comment sub-video corresponding to the first target comment includes:

determining whether a deletion moment of the last first comment segment matches the target synthesis material;

when the deletion moment of the last first comment segment does not match the target synthesis material, processing the target synthesis material to obtain an updated synthesis material; and displaying each first comment segment to the updated synthesis material at the corresponding insertion moment, and deleting each first comment segment from the updated synthesis material at the corresponding deletion moment, to obtain the comment sub-video corresponding to the first target comment.

It should be noted that the target synthesis material corresponding to each target comment is configured in the target text video template. However, for a specific target comment, duration of a pre-configuration target synthesis material may not match total duration of all comment segments to be inserted into the target synthesis material. Therefore, the target synthesis material may be processed to enable each comment segment to more match the corresponding target synthesis material.

In actual application, the deletion moment of the last first comment segment may represent a moment at which display of all the video segments in the first target comment is completed. If the deletion moment of the last first comment segment does not match the target synthesis material, it indicates that the target video material is not exactly ended when display of the last first comment segment is completed. Therefore, in this case, the target synthesis material may be processed to obtain the updated synthesis material, and each first comment segment is displayed to the updated synthesis material at the corresponding insertion moment, and each first comment segment is deleted from the updated synthesis material at the corresponding deletion moment, to obtain the comment sub-video corresponding to the first target comment.

In specific implementation, there are two cases in which the deletion moment of the last first comment segment does not match the target synthesis material. In one case, the deletion moment of the last first comment segment is earlier than an end moment of the target synthesis material, that is, display of each comment segment in the first target comment is completed, but the corresponding target synthesis material is not ended. In this case, the target synthesis material may be clipped, and a material that is displayed from the start moment to the deletion moment in the target synthesis material may be used as the updated synthesis material. In the other case, the deletion moment of the last first comment segment is later than an end moment of the target synthesis material, that is, display of each comment segment in the first target comment is not completed, but the corresponding target synthesis material is ended. In this case, the target synthesis material may be cycled until an end moment of a synthesis material obtained through combination is the same as the deletion moment, to obtain the updated synthesis material.

In the foregoing example, if the target synthesis material is a video whose duration is 100 seconds, the target synthesis material may be clipped to obtain a synthesis material in 0-85 seconds as the updated synthesis material. Alternatively, if the target synthesis material is a video whose duration is 20 seconds, the target synthesis material may be cycled for five times, and only the target synthesis material in the first 5 seconds is captured in the fifth cycle, and is spliced with the target synthesis material in the first 4 cycles, to obtain the updated synthesis material in 85 seconds.

In this embodiment of this application, when it is determined that the deletion moment of the last first comment segment does not match the target synthesis material, the target synthesis material may be processed to obtain the updated synthesis material, and then each comment segment in the first target comment is inserted into the updated synthesis material, so that each comment segment more matches the corresponding target synthesis material, to improve experience of viewing the generated comment video.

In an optional implementation of this embodiment, when the corresponding audio segment is generated for each comment segment, a specific implementation process of adding the at least one comment segment included in each target comment to the synthesis material, to generate the corresponding comment video may be:

determining a display time of each audio segment, and using the display time of each audio segment as a display time of the corresponding comment segment; and adding the at least one comment segment included in each target comment and the audio segment corresponding to each comment segment to the synthesis material based on the display time of each audio segment, to generate the corresponding comment video.

It should be noted that when the corresponding audio segment is generated for each comment segment, the display time of the audio segment may be directly used as the display time of the corresponding comment segment, and then the at least one comment segment included in each target comment and the audio segment corresponding to each comment segment may be added to the synthesis material based on the display time, to generate the corresponding comment video. In this way, the track of the comment segment and a track of the audio segment may automatically correspond to each other, and the user does not need to manually perform a drag operation. The user needs to perform only a simple selection operation, there is relatively weak dependence on the user, and a video generation process is simple. Therefore, a requirement for a capability of the user is lowered, and comment video generation efficiency is improved.

In addition, the posting user information corresponding to the at least one comment segment may be synchronously added.

In an optional implementation of this embodiment, after the at least one comment segment included in each target comment is added to the synthesis material, to generate the corresponding comment video, the method may further include:

displaying the comment video and a corresponding edit control in a video preview interface; and editing the synthesized comment video based on the edit control when it is detected that the edit control is triggered.

In actual application, after the comment video is synthesized, the synthesized comment video may be previewed in the video preview interface, and the corresponding edit control is displayed in the video preview interface. Based on the edit control, the displayed comment segment, posting user information, audio segment, and the like may be edited for the second time. For example, the comment segment may be split for the second time; detailed information may be obtained for the posting user information, but original information cannot be modified; and a timbre may be switched for the audio segment.

Figure 5A:
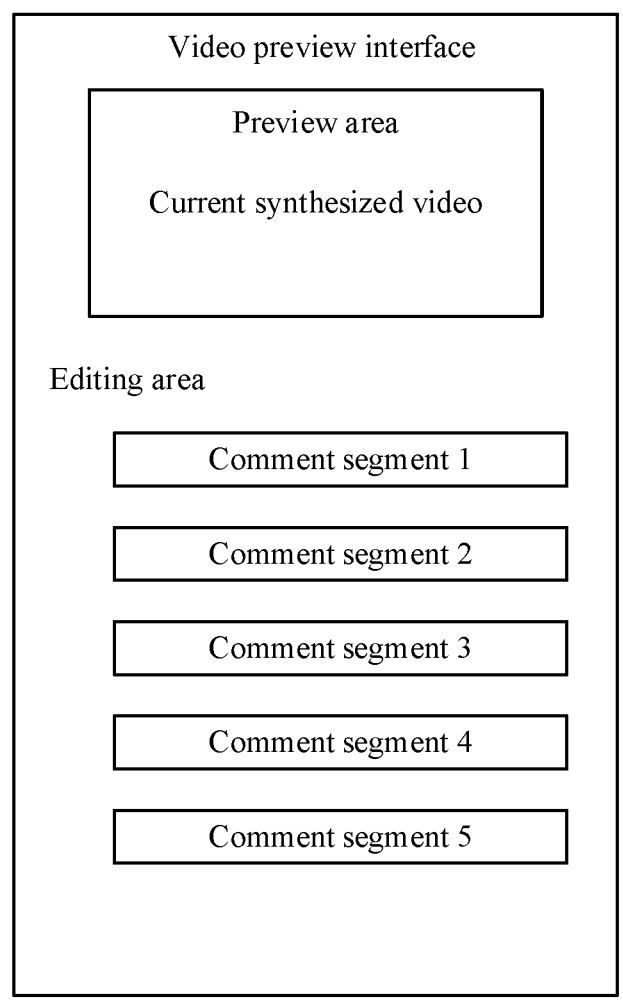
FIG. 5a is a schematic diagram of a video preview interface according to an embodiment of this application.
Figure 5B:
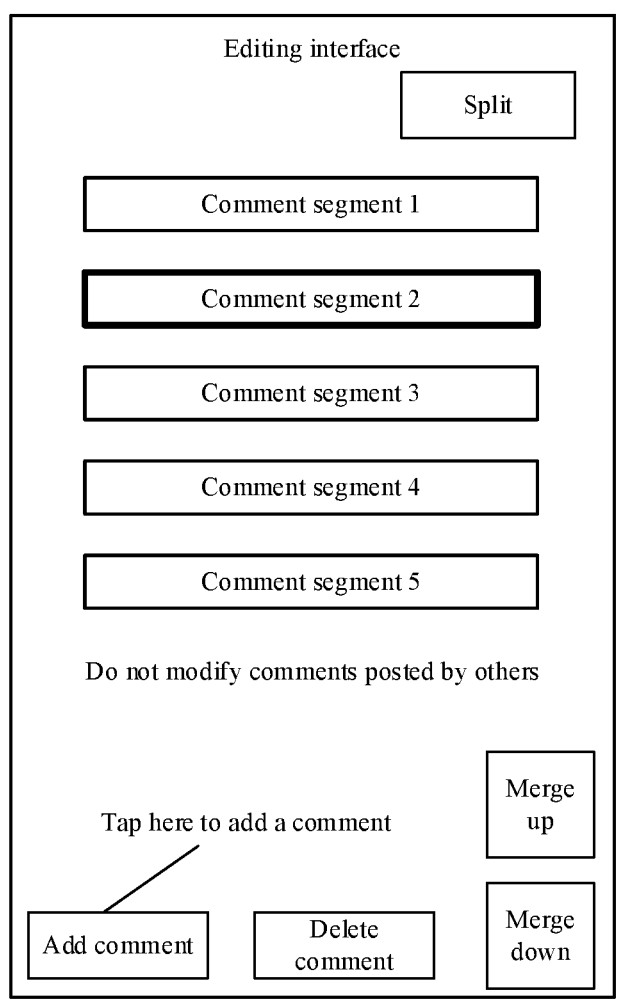
FIG. 5b is a schematic diagram of an editing interface according to an embodiment of this application.

For example, FIG. 5a is a schematic diagram of a video preview interface according to an embodiment of this application. As shown in FIG. 5a, the video preview interface includes a preview area and an editing area. The current synthesized comment video is displayed in the preview area. Edit controls of all the comment segments (comment segments 1-5) are displayed in the editing area. All of the comment segments 1-5 may be used as edit controls. When the user taps any comment segment, an editing interface shown in FIG. 5b may be displayed (which may be displayed in full screen or may be displayed in the editing area in the video preview interface). FIG. 5b is a schematic diagram of an editing interface according to an embodiment of this application. Full-screen display is used as an example. The editing interface includes the comment segments 1-5 that can be edited.

In addition, when the user taps a text area, a false cursor is displayed, and a keyboard is not enabled, but a related operation (mainly including adding a comment for the second time, readjusting sentence segmentation of comment text, and the like) in a text bar is displayed and supported, that is, splitting of a comment is supported, and a poster name corresponding to each piece of comment text is still displayed in a whole process when each piece of comment text correspondingly appears in a picture after splitting. However, content modification is not supported. For example, when the user taps specific content in a comment segment (for example, the comment segment 2) displayed in the editing interface, a specified modification prompt solution may be displayed, for example, "do not modify comments posted by others", as shown in FIG. 5b.

As shown in FIG. 5b, the editing interface includes a plurality of edit sub-controls, for example, "add comment", "delete comment", "split", "merge up", and "merge down". When the user taps a text area, a false cursor is displayed, and a keyboard is not enabled, but a related operation (mainly including adding a comment for the second time, readjusting sentence segmentation of comment text, and the like) in a text bar is displayed and supported. When a full-screen editing interface is entered for the first time, a wizard of "add comment" may be first displayed, for example, there is a prompt "tap here to add a comment" at the "add comment" control. After a comment segment (for example, the comment segment 2) is selected, sentence splitting may be performed again by using the "split" control displayed above the comment segments 1-5. When the user taps the "add comment" control, the recommended comment display interface shown in FIG. 2d may be presented to add a comment for the second time. In addition, the user may tap the "delete comment" control, to delete all text of a corresponding recommended comment poster on a current page.

A user name profile picture can be tapped to enable user name details to be displayed, and the user cannot edit an original poster name of a comment.

According to the comment video generation method provided in this application, a plurality of configured text video templates may be provided in advance for a user to select, and the user may directly select the target text video template, where the synthesis material of the comment video is configured in the target text video template; may determine the target comment required for video synthesis based on the selected target text video template; obtain the at least one comment segment included in each target comment; and automatically add the at least one comment segment included in each target comment to the synthesis material configured in the target text video template, to generate the corresponding comment video. In this way, the user may quickly import, based on the target text video template, a comment that the user likes, automatically segment the comment into a plurality of segments, and add the plurality of segments to corresponding locations in the synthesis material, to generate the corresponding comment video. Therefore, a viewing effect of the comment video is improved. In addition, the user needs to perform only a simple selection operation, there is relatively weak dependence on the user, and a video generation process is simple. Therefore, a requirement for a capability of the user is lowered, and comment video generation efficiency is improved.

Figure 6:
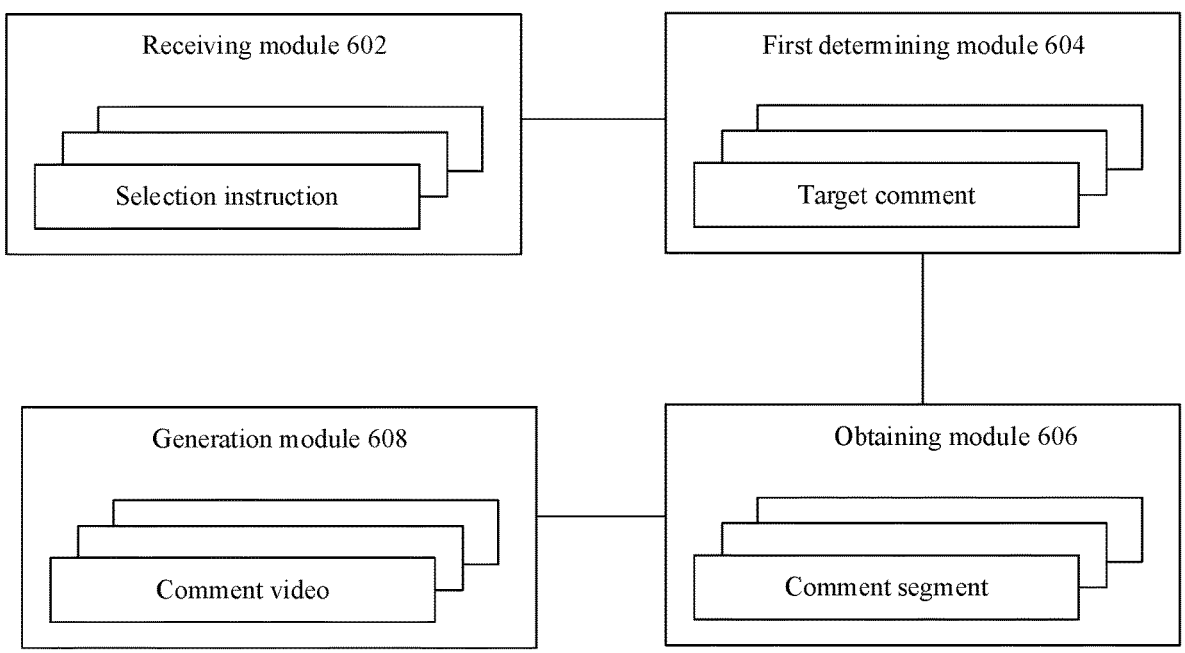
FIG. 6 is a schematic diagram of a structure of a comment video generation apparatus according to an embodiment of this application.

Corresponding to the method embodiments, this application further provides an embodiment of a comment video generation apparatus. FIG. 6 is a schematic diagram of a structure of a comment video generation apparatus according to an embodiment of this application. As shown in FIG. 6, the apparatus includes:

a receiving module 602, configured to receive a selection instruction for a target text video template, where the target text video template includes a synthesis material of a comment video;

a first determining module 604, configured to determine at least one target comment corresponding to the target text video template;

an obtaining module 606, configured to obtain at least one comment segment included in each target comment, where the comment segment is obtained by segmenting the target comment; and a generation module 608, configured to add the at least one comment segment included in each target comment to the synthesis material, to generate a corresponding comment video.

According to the comment video generation apparatus provided in this application, a plurality of configured text video templates may be provided in advance for a user to select, and the user may directly select the target text video template, where the synthesis material of the comment video is configured in the target text video template; may determine the target comment required for video synthesis based on the selected target text video template; obtain the at least one comment segment included in each target comment; and automatically add the at least one comment segment included in each target comment to the synthesis material configured in the target text video template, to generate the corresponding comment video. In this way, the user may quickly import, based on the target text video template, a comment that the user likes, automatically segment the comment into a plurality of segments, and add the plurality of segments to corresponding locations in the synthesis material, to generate the corresponding comment video.

Therefore, a viewing effect of the comment video is improved. In addition, the user needs to perform only a simple selection operation, there is relatively weak dependence on the user, and a video generation process is simple. Therefore, a requirement for a capability of the user is lowered, and comment video generation efficiency is improved.

Optionally, the target text video template further includes a recommended comment obtaining rule and a recommended comment sorting rule; and the first determining module 604 is further configured to:
- obtain at least one corresponding recommended comment from a comment database based on the recommended comment obtaining rule when a comment import instruction is received;
- display the at least one recommended comment based on the recommended comment sorting rule; and
- use, as the target comment, a recommended comment indicated by a received selection operation, where the selection operation is an operation of selecting a comment from the at least one recommended comment.

Optionally, the target text video template further includes a comment display parameter; and the generation module 608 is further configured to:
- determine a target synthesis material corresponding to a first target comment, where the first target comment is any one of the at least one target comment;
- determine a display time of at least one first comment segment included in the first target comment in the target synthesis material based on the comment display parameter;
- insert the at least one first comment segment into the target synthesis material based on the display time, to obtain a comment sub-video corresponding to the first target comment; and
- combine comment sub-videos corresponding to all the target comments, to generate the comment video.

Optionally, the first target comment carries posting user information; and the generation module 608 is further configured to:
- use the display time as a display time of the posting user information; and
- insert the at least one first comment segment and the posting user information into the target synthesis material based on the display time, to obtain the comment sub-video corresponding to the first target comment.

Optionally, the comment display parameter includes an initial display moment and display duration of the first comment segment; and the generation module 608 is further configured to:
- use the initial display moment as a target display moment;
- use the target display moment as an insertion moment of an $i^{th}$ first comment segment, where i is a positive integer;
- determine a deletion moment of the $i^{th}$ first comment segment based on the insertion moment and the display duration; and
- update the target display moment to the deletion moment, increasing i by 1, and performing the step of using the target display moment as an insertion moment of an $i^{th}$ first comment segment, until i is equal to a quantity of the at least one first comment segment, to obtain an insertion moment and a deletion moment of each first comment segment.

Optionally, the generation module 608 is further configured to:
- determine whether a deletion moment of the last first comment segment matches the target synthesis material;
- when the deletion moment of the last first comment segment does not match the target synthesis material, process the target synthesis material to obtain an updated synthesis material; and
- display each first comment segment to the updated synthesis material at the corresponding insertion moment, and delete each first comment segment from the updated synthesis material at the corresponding deletion moment, to obtain the comment sub-video corresponding to the first target comment.

Optionally, the target text video template further includes an initially specified timbre; and the apparatus further includes a second determining module, configured to:
- determine an audio segment corresponding to each comment segment based on the initially specified timbre.

Correspondingly, the generation module 608 is further configured to:
- determine a display time of each audio segment, and use the display time of each audio segment as a display time of the corresponding comment segment; and
- add the at least one comment segment included in each target comment and the audio segment corresponding to each comment segment to the synthesis material based on the display time of each audio segment, to generate the corresponding comment video.

Optionally, the target text video template further includes a comment segmentation rule; and the obtaining module 606 is further configured to:
- determine a segmentation manner of a second target comment based on the comment segmentation rule, where the second target comment is any one of the at least one target comment;
- and segment the second target comment in the segmentation manner, to obtain at least one second comment segment included in the second target comment.

Optionally, the obtaining module 606 is further configured to:
- when the segmentation manner is single sentence segmentation, segment the second target comment into at least one comment sentence, and use the at least one comment sentence as the at least one second comment segment included in the second target comment; or
- when the segmentation manner is combinatorial segmentation, segment the second target comment into at least one comment sentence, and combine the at least one comment sentence to obtain the at least one second comment segment included in the second target comment.

Optionally, the obtaining module 606 is further configured to:
- initially segment the second target comment based on a specified segmentation rule, to obtain an initial comment sentence;
- determine a to-be-segmented sentence whose sentence length exceeds a maximum length limit in each initial comment sentence, where the maximum length limit is a parameter included in the comment segmentation rule;
- re-segment the to-be-segmented sentence based on the sentence length of the to-be-segmented sentence, the maximum length limit, and a specified phrase dictionary, to obtain a comment sentence that meets the maximum length limit, where the specified phrase dictionary is a set of at least one specified phrase; and use the comment sentence that meets the maximum length limit as the at least one comment sentence included in the second target comment.

Optionally, the obtaining module 606 is further configured to:

determine a to-be-combined sentence whose sentence length is less than a minimum length limit in the comment sentence that meets the maximum length limit, where the minimum length limit is a parameter included in the comment segmentation rule;

combine the to-be-combined sentence based on a specified combination rule, to obtain a comment sentence that meets the minimum length limit; and use a comment sentence that meets the maximum length limit and the minimum length limit as the at least one comment sentence included in the second target comment.

Optionally, the obtaining module 606 is further configured to:

determine whether every two adjacent sentences in the at least one comment sentence belong to a same segment; and combine comment sentences that belong to a same segment into one second comment segment.

Optionally, the apparatus further includes an editing module, configured to:

display the comment video and a corresponding edit control in a video preview interface; and edit the synthesized comment video based on the edit control when it is detected that the edit control is triggered.

A schematic solution of the comment video generation apparatus in the embodiments is described above. It should be noted that the technical solution of the comment video generation apparatus and the technical solution of the comment video generation method belong to the same concept. For detailed content not described in detail in the technical solution of the comment video generation apparatus, refer to the descriptions of the technical solution of the comment video generation method.

Figure 7:
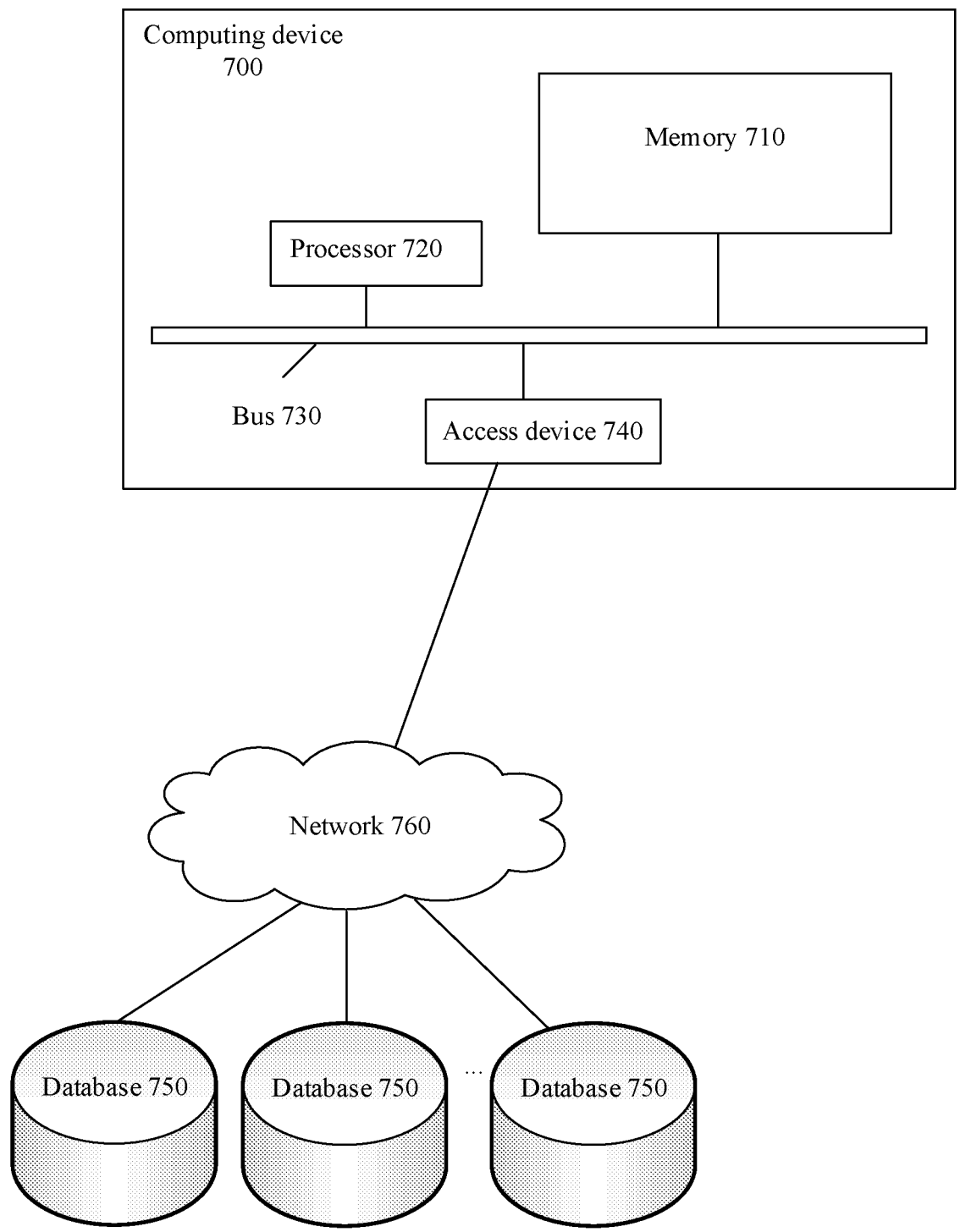
FIG. 7 is a block diagram of a computing device according to an embodiment of this application.

FIG. 7 is a block diagram of a computing device according to an embodiment of this application. Components of the computing device 700 include but are not limited to a memory 710 and a processor 720. The processor 720 and the memory 710 are connected by using a bus 730, and a database 750 is configured to store data.

The computing device 700 further includes an access device 740, and the access device 740 enables the computing device 700 to perform communication by using one or more networks 760. Examples of these networks include a public switched telephone network (PSTN), a local area network (LAN), a wide area network (WAN), a personal area network (PAN), or a combination of communication networks such as the Internet. The access device 740 may include one or more of any type of wired or wireless network interface (for example, a network interface controller (NIC)), for example, an IEEE 802.11 wireless local area network (WLAN) wireless interface, a worldwide interoperability for microwave access (WiMAX) interface, an Ethernet interface, a universal serial bus (USB) port, a cellular network interface, a Bluetooth interface, or a near field communication (NFC) interface.

In an embodiment of this application, the foregoing components of the computing device 700 and other components not shown in FIG. 7 may alternatively be connected to each other, for example, by using the bus. It should be understood that the block diagram of the structure of the computing device shown in FIG. 7 is merely used as an example instead of a limitation on the scope of this application. A person skilled in the art may add or replace other components as required.

The computing device 700 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a static computing device such as a desktop computer or a PC. The computing device 700 may alternatively be a mobile or static server.

The processor 720 is configured to execute the following computer executable instructions to implement the steps of the comment video generation method.

A schematic solution of the computing device in the embodiments is described above. It should be noted that the technical solution of the computing device and the technical solution of the comment video generation method belong to a same concept. For detailed content not described in detail in the technical solution of the computing device, refer to the descriptions of the technical solution of the comment video generation method.

An embodiment of this application further provides a computer-readable storage medium. The computer-readable storage medium stores computer executable instructions. When the computer executable instructions are executed by a processor, the steps of the comment video generation method are implemented.

A schematic solution of the computer-readable storage medium in the embodiments is described above. It should be noted that the technical solution of the storage medium and the technical solution of the comment video generation method belong to a same concept. For detailed content not described in detail in the technical solution of the storage medium, refer to the descriptions of the technical solution of the comment video generation method.

Specific embodiments of this application are described above. Other embodiments fall within the scope of the appended claims. In some cases, actions or steps described in the claims may be performed in an order different from those in the embodiments and desired results may still be achieved. In addition, processes described in the accompanying drawings do not necessarily require a specific order or a sequential order shown to achieve the desired results. In some implementations, multi-task processing and parallel processing can or may be advantageous.

The computer instructions include computer program code, which may be in a source code form, an object code form, an executable file, an intermediate form, or the like. The computer-readable medium may include any entity or apparatus capable of carrying the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like.

It should be noted that for ease of description, the foregoing method embodiments are described as a combination of a series of actions. However, a person skilled in the art should understand that this application is not limited to the described action order, because according to this application, some steps may be performed in another order or simultaneously. In addition, a person skilled in the art should also understand that the embodiments described in this specification are all preferred embodiments, and involved actions and modules are not necessarily mandatory to this application.

In the foregoing embodiments, descriptions of the embodiments have respective focuses. For a part that is not described in detail in an embodiment, refer to related descriptions in another embodiment.

The preferred embodiments of this application disclosed above are merely intended to help describe this application. In the optional embodiments, all details are not described in detail, and the present invention is not limited to the specific implementations. Obviously, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A method of generating comment videos, comprising:
   receiving a selection of a target text video template, wherein the target text video template is associated with synthesis material, and wherein the synthesis material comprises a video track;
   determining at least one target comment corresponding to the target text video template;
   segmenting the at least one target comment and obtaining at least one comment segment comprised in each of the at least one target comment; and
   generating a corresponding comment video by adding the at least one comment segment of each target comment to the synthesis material.

2. The method according to claim 1, wherein the target text video template is associated with a rule of recommending comments and a rule of ranking recommended comments, and wherein the determining at least one target comment corresponding to the target text video template further comprises:
   recommending at least one subset of corresponding comments from a comment database based on the rule of recommending comments in response to receiving an instruction of importing comments;
   displaying the at least one subset of corresponding comments based on the rule of ranking recommended comments; and
   determining the at least one target comment in response to receiving a selection of at least one comment from the displayed at least one subset of corresponding comments.

3. The method according to claim 1, wherein the target text video template further comprises a comment display parameter, and wherein the generating the comment video by adding the at least one comment segment of each target comment to the synthesis material further comprises:
   determining a target synthesis material corresponding to a first target comment, wherein the first target comment is any one of the at least one target comment, and wherein the at least one target comment comprises a plurality of target comments;
   determining a display time of at least one comment segment of the first target comment in the target synthesis material based on the comment display parameter;
   generating a comment sub-video corresponding to the first target comment by inserting the at least one comment segment of the first target comment into the target synthesis material based on the display time; and
   generating the comment video by combining comment sub-videos corresponding to the plurality of target comments.

4. The method according to claim 3, wherein the first target comment carries user information about a user posting the comment video;
   wherein after the determining a display time of at least one comment segment of the first target comment in the target synthesis material based on the comment display parameter, the method further comprises identifying the display time as a display time of the user information; and
   wherein the generating a comment sub-video corresponding to the first target comment by inserting the at least one comment segment of the first target comment into the target synthesis material based on the display time further comprises generating the comment sub-video corresponding to the first target comment by inserting the at least one comment segment and the user information into the target synthesis material based on the display time.

5. The method according to claim 3, wherein the comment display parameter comprises an initial display time and a display duration of displaying a corresponding comment segment among the at least one comment segment of the first target comment, wherein the at least one comment segment of the first target comment comprises a plurality of comment segments, and wherein the determining a display time of at least one comment segment of the first target comment in the target synthesis material based on the comment display parameter further comprises:
   identifying the initial display time of the corresponding comment segment as an insertion moment of the corresponding comment segment among the plurality of comment segments;
   inserting an $i^{th}$ comment segment in the target synthesis material at a corresponding insertion moment, wherein i is a positive integer;
   determining a deletion moment of removing the $i^{th}$ comment segment based on the corresponding insertion moment and a corresponding display duration; and
   determining an insertion moment and a deletion moment corresponding to each of the plurality of comment segments by repeating the above operations until i is equal to a total number of the plurality of comment segments.

6. The method according to claim 5, wherein the generating a comment sub-video corresponding to the first target comment by inserting the at least one comment segment into the target synthesis material based on the display time further comprises:
   determining whether a deletion moment of a last one of the plurality of comment segments matches the target synthesis material;
   in response to determining that the deletion moment of the last one of the plurality of comment segments does not match the target synthesis material, processing the target synthesis material to obtain an updated synthesis material; and
   generating the comment sub-video corresponding to the first target comment by inserting each of the plurality of comment segments to the updated synthesis material at the corresponding insertion moment for display, and deleting each of the plurality of first comment segments from the updated synthesis material at the corresponding deletion moment.

7. The method according to claim 1, wherein the target text video template is associated with an initially specified timbre;
   wherein after the obtaining at least one comment segment comprised in each of the at least one target comment, the method further comprises determining an audio segment corresponding to each comment segment based on the initially specified timbre; and
   wherein the generating the comment video by adding the at least one comment segment of each target comment to the synthesis material further comprises:
   determining a playback time of each audio segment, and identifying the playback time of each audio segment as a display time of a corresponding comment segment, and
   generating the comment video by adding the at least one comment segment and a corresponding audio segment to the synthesis material based on the playback time of the corresponding audio segment.

8. The method according to claim 1, wherein the target text video template is associated with a rule of segmenting comments, and wherein the segmenting the at least one target comment and obtaining at least one comment segment comprised in each of the at least one target comment further comprises:
   determining a segmentation manner of segmenting a target comment based on the rule of segmenting comments, wherein the target comment is any one of the at least one target comment; and
   segmenting the target comment based on the segmentation manner and obtaining at least one comment segment of the target comment.

9. The method according to claim 8, wherein the segmenting the target comment based on the segmentation manner and obtaining at least one comment segment of the target comment further comprises:
   in response to determining that the segmentation manner is to segment the target comment to one or more single sentences, segmenting the target comment into at least one comment sentence, and identifying the at least one comment sentence as the at least one comment segment of the target comment; or
   in response to determining that the segmentation manner is a combinatorial segmentation, segmenting the target comment into at least one comment sentence comprising a plurality of comment sentences, and combining at least a subset of the plurality of comment sentences to obtain the at least one comment segment of the target comment.

10. The method according to claim 9, wherein the segmenting the target comment into at least one comment sentence further comprises:
    initially segmenting the target comment based on a specified segmentation rule to obtain at least one initial comment sentence;
    determining whether a sentence length of each initial comment sentence exceeds a maximum length limit, wherein the maximum length limit is a parameter comprised in the rule of segmenting comments;
    in response to determining that a sentence length of any initial comment sentence exceeds the maximum length limit, re-segmenting the initial comment sentence based on the sentence length of the initial comment sentence, the maximum length limit, and a specified phrase dictionary, to obtain comment sentences that meet the maximum length limit, wherein the specified phrase dictionary comprises a plurality of specified phrases; and
    identifying at least one of the comment sentences that meets the maximum length limit as the at least one comment sentence comprised in the target comment.

11. The method according to claim 10, wherein after obtaining the comment sentences that meet the maximum length limit, the method further comprises:
    determining whether sentence lengths of the comment sentences are less than a minimum length limit, wherein the minimum length limit is a parameter comprised in the rule of segmenting comments;
    in response to determining that any of the sentence lengths is less than the minimum length limit, combining at least a subset of the comment sentences based on a specified combination rule to obtain a comment sentence that meets the minimum length limit; and
    identifying the comment sentence that meets the maximum length limit and the minimum length limit as the at least one comment sentence comprised in the target comment.

12. The method according to claim 9, wherein the combining the at least a subset of the plurality of comment sentences to obtain the at least one comment segment of the target comment comprises:
    determining whether every two adjacent sentences in the plurality of comment sentences belong to a same segment; and
    combining comment sentences that belong to the same segment to obtain the at least one comment segment of the target comment.

13. The method according to claim 1, wherein after the generating the comment video by adding the at least one comment segment of each target comment to the synthesis material, the method further comprises:
    displaying the comment video and corresponding edit controls on a video preview interface; and
    editing the comment video based on at least one of the edit controls in response to detecting that the at least one of the edit controls is triggered.

14. A computing device, comprising:
    a memory and a processor, wherein the memory is configured to store computer executable instructions, and the processor is configured to execute the computer executable instructions to implement operations comprising:
    receiving a selection of a target text video template, wherein the target text video template is associated with synthesis material, and wherein the synthesis material comprises a video track;
    determining at least one target comment corresponding to the target text video template;
    segmenting the at least one target comment and obtaining at least one comment segment comprised in each of the at least one target comment; and
    generating a corresponding comment video by adding the at least one comment segment of each target comment to the synthesis material.

15. The computing device according to claim 14, wherein the target text video template is associated with a rule of recommending comments and a rule of ranking recommended comments, and wherein the determining at least one target comment corresponding to the target text video template further comprises:

recommending at least one subset of corresponding comments from a comment database based on the rule of recommending comments in response to receiving an instruction of importing comments;

displaying the at least one subset of corresponding comments based on the rule of ranking recommended comments; and determining the at least one target comment in response to receiving a selection of at least one comment from the displayed at least one subset of corresponding comments.

16. The computing device according to claim 14, wherein the target text video template further comprises a comment display parameter, and wherein the generating the comment video by adding the at least one comment segment of each target comment to the synthesis material further comprises:

determining a target synthesis material corresponding to a first target comment, wherein the first target comment is any one of the at least one target comment, and wherein the at least one target comment comprises a plurality of target comments;

determining a display time of at least one comment segment of the first target comment in the target synthesis material based on the comment display parameter;

generating a comment sub-video corresponding to the first target comment by inserting the at least one comment segment of the first target comment into the target synthesis material based on the display time; and generating the comment video by combining comment sub-videos corresponding to the plurality of target comments.

17. The computing device according to claim 14, wherein the target text video template is associated with an initially specified timbre;

wherein after the obtaining at least one comment segment comprised in each of the at least one target comment, the method further comprises determining an audio segment corresponding to each comment segment based on the initially specified timbre; and wherein the generating the comment video by adding the at least one comment segment of each target comment to the synthesis material further comprises:

determining a playback time of each audio segment, and identifying the playback time of each audio segment as a display time of a corresponding comment segment, and generating the comment video by adding the at least one comment segment and a corresponding audio segment to the synthesis material based on the playback time of the corresponding audio segment.

18. The computing device according to claim 14, wherein the target text video template is associated with a rule of segmenting comments, and wherein the segmenting the at least one target comment and obtaining at least one comment segment comprised in each of the at least one target comment further comprises:

determining a segmentation manner of segmenting a target comment based on the rule of segmenting comments, wherein the target comment is any one of the at least one target comment; and segmenting the target comment based on the segmentation manner and obtaining at least one comment segment of the target comment.

19. The computing device according to claim 14, wherein after the generating the comment video by adding the at least one comment segment of each target comment to the synthesis material, the method further comprises:

displaying the comment video and corresponding edit controls on a video preview interface; and editing the comment video based on at least one of the edit controls in response to detecting that the at least one of the edit controls is triggered.

20. A non-transitory computer-readable storage medium, wherein the computer-readable storage medium stores computer executable instructions, and when the computer executable instructions are executed by a processor, the processor implement operations comprising:

receiving a selection of a target text video template, wherein the target text video template is associated with synthesis material, and wherein the synthesis material comprises a video track;

determining at least one target comment corresponding to the target text video template;

segmenting the at least one target comment and obtaining at least one comment segment comprised in each of the at least one target comment; and generating a corresponding comment video by adding the at least one comment segment of each target comment to the synthesis material.

* * * * *